(12) United States Patent
Flint

(10) Patent No.: US 6,771,326 B2
(45) Date of Patent: Aug. 3, 2004

(54) MULTI-SCREEN LASER PROJECTION SYSTEM USING A SHARED LASER SOURCE

(75) Inventor: Graham W. Flint, Albuquerque, NM (US)

(73) Assignee: General Atomics, Inc., San Diego, CA (US)

( * ) Notice: Subject to any disclaimer, the term of this patent is extended or adjusted under 35 U.S.C. 154(b) by 453 days.

(21) Appl. No.: 10/053,287

(22) Filed: Oct. 26, 2001

(65) Prior Publication Data

US 2002/0063854 A1 May 30, 2002

Related U.S. Application Data

(60) Provisional application No. 60/265,405, filed on Jan. 31, 2001, provisional application No. 60/263,844, filed on Jan. 23, 2001, provisional application No. 60/243,900, filed on Oct. 26, 2000, and provisional application No. 60/243,906, filed on Oct. 26, 2000.

(51) Int. Cl.[7] .............................. H04N 9/31; H04N 5/74
(52) U.S. Cl. ......................... 348/744; 348/750; 353/94; 353/82
(58) Field of Search ................................. 348/744, 750, 348/758, 755, 764, 770, 383; 353/94, 31, 48, 82; 359/443, 449, 460; H04N 9/31, 5/74

(56) References Cited

U.S. PATENT DOCUMENTS

| | | | |
|---|---|---|---|
| 2,611,817 A | | 9/1952 | Schwarz |
| 2,731,511 A | | 1/1956 | Wiesen |
| 4,090,219 A | | 5/1978 | Ernstoff et al. |
| 5,212,582 A | | 5/1993 | Nelson |
| 5,339,118 A | * | 8/1994 | Tagami ........................ 348/744 |
| 5,452,024 A | | 9/1995 | Sampsell |
| 5,526,051 A | | 6/1996 | Gove et al. |
| 5,534,950 A | | 7/1996 | Hargis et al. |
| 5,990,983 A | | 11/1999 | Hargis et al. |
| 6,154,259 A | | 11/2000 | Hargis et al. |
| 6,309,072 B1 | * | 10/2001 | Deter ........................... 353/31 |
| 6,426,781 B1 | * | 7/2002 | Lee ............................. 348/744 |

* cited by examiner

*Primary Examiner*—Sherrie Hsia
(74) *Attorney, Agent, or Firm*—Law Offices of James D. McFarland

(57) ABSTRACT

A multi-screen laser projection system comprises a laser source that generates a plurality of laser beams, an image display control system, a plurality of modulator arms each including a light modulator; and an optical switch coupled to the image display control system and modulators. A plurality of projection optical systems are respectively arranged to project the modulated light from each modulator onto its associated screen. The optical switch is arranged to receive the plurality of beams from the laser source and switch each of the beams to one of the modulator arms in order to illuminate each modulator with a sequence of colors during each frame. During the course of a frame, each of the colors becomes incident upon the modulator. The projection system disclosed herein can provide a cost-effective, efficient true digital projection display system with high resolution and high brightness.

25 Claims, 2 Drawing Sheets

MULTI-SCREEN LASER PROJECTION SYSTEM USING A SHARED LASER SOURCE

CROSS-REFERENCE TO RELATED APPLICATION

Priority is hereby claimed to U.S. Provisional Application No. 60/243,906 filed Oct. 26, 2000, entitled MULTI-SCREEN LASER PROJECTION SYSTEM USING A SHARED LASER, U.S. Provisional Application No. 60/243,900 filed Oct. 26, 2000, entitled DIGITAL DISPLAY SYSTEM USING PULSED LASERS, U.S. Provisional Application No. 60/265,405 filed Jan. 31, 2001, entitled DIGITAL DISPLAY SYSTEM USING PULSED LASERS, and U.S. Provisional Application No. 60/263,844 filed Jan. 23, 2001, entitled DIGITAL DISPLAY SYSTEM USING PULSED LASERS, all of which are by the same inventor and all of which are incorporated by reference herein.

BACKGROUND OF THE INVENTION

1. Field of the Invention

This invention relates to digital laser projection systems.

2. Description of Related Art

Conventional cinemas utilize film projection systems that illuminate film with a high-brightness source of white light. A moving image in film is represented in a series of frames that are rapidly drawn over an aperture in the projector, and the resulting image is projected onto a screen using projection optical systems. When viewed, the projected image appears to be a video "moving picture". Although in wide use, such projection systems have a number of problems; for example, film wears down over time, brightness is inherently limited, and the individual film copies can be expensive.

While traditional cinemas have relied almost exclusively upon film projectors, cinemas of the future will utilize an alternative projection system in which red, green, and blue light is modulated by light modulators and then projected onto a screen using projection optics. One such proposed alternative projection system utilizes a red laser, a green laser, and a blue laser, each of which are individually modulated in a series of "frames" and then projected onto a screen to create a full color image. One disadvantage of such a system is that the red, green, and blue lasers must be individually synchronized with their light modulators, which requires additional hardware. Another disadvantage is that the color combiner that combines the modulated red, green, and blue beams is difficult and expensive to implement in such a way that the three colors are precisely registered on top of each other and thereby appear as a single image. Even a slight misregistration of any one of the three colors can cause serious problems with the image.

Full-color digital movie data typically has a red green and blue (RGB) format in which red, green, and blue data has a respective brightness value stored for each pixel and each frame. Theoretically, this RGB data can be straightforwardly projected by a digital projection system by modulating red, green, and blue laser beams, if such a system were available. One advantage of a laser projection system is that digital movies can be distributed entirely in a digital format such as a computer file. A digital image format provides improved image quality and consistency over time because, unlike film, digital images do not "wear down". Furthermore, a digital movie format can be more easily combined with other information such as supplemental commercials or directed advertising. Generally, digital movie formats are a much more cost-effective and efficient way of distribution than film, and it would be useful to provide a cost-effective projection system so that digital movie formats could be used in place of film.

SUMMARY OF THE INVENTION

A multi-screen laser projection system for projecting images onto a plurality of screens is disclosed comprising a laser source that generates a plurality of laser beams, at least two of the laser beams having differing color, an image display control system that receives image data indicative of the images to be projected, a plurality of modulator arms, each modulator arm including a light modulator coupled to the image control system, and an optical switch situated between the laser source and the plurality of modulator arms, the optical switch coupled to the image display control system and arranged to receive the plurality of beams from the laser source and switch each of the beams to a selected one of the modulator arms.

A multi-screen projection system is disclosed herein that utilizes a shared laser source switched among several different modulator arms in order to illuminate each modulator with a sequence of colors during each frame. During the course of a frame, each of the colors becomes incident upon the modulator. Each screen displays an image that is generated by modulating the individual pixels in its respective two-dimensional light modulator array. Specifically, during the period while a color is illuminating the light modulator, each individual pixel is modulated to provide the illumination corresponding to that color for that pixel for that frame. Proper registration of all colors on each pixel is facilitated because a single modulator is used to modulate all colors for each screen.

The projection system disclosed herein can provide a cost-effective, true digital projection display system, which allows movies to be transferred in an electronic digital format, providing consistency in color rendering and image quality over time without the degradation experienced by film. Furthermore, the projection system can make more efficient use of laser energy than conventional systems. In some embodiments, only a single source of laser energy for each color is required to illuminate multiple screens, thereby simplifying the projection system and reducing cost.

Advantageously, the projection display system disclosed herein can be implemented with high brightness and/or high resolution displays. As compared with a laser scanning system, beam requirements for the disclosed system can be less stringent, which allows lower cost optical systems to be used and permits higher power. For example, a diffraction limited beam is not required in some embodiments, thereby simplifying the optics and allowing use of larger fibers, among other advantages.

In one example herein, the two-dimensional light modulator array comprises a digital micromirror device (DMD), although other embodiments could utilize another type of light modulator. A DMD is a two-dimensional light modulator that modulates the incident light by moving each individual micromirror between a first and second state. In the first state of the pixel, the light incident upon the micromirror is projected toward the projection system for display, and in the second state, the incident light is directed elsewhere, such as to a beam dump or otherwise.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the Figures, in which like numbers represent the same or similar elements.

Description

Figure 1:
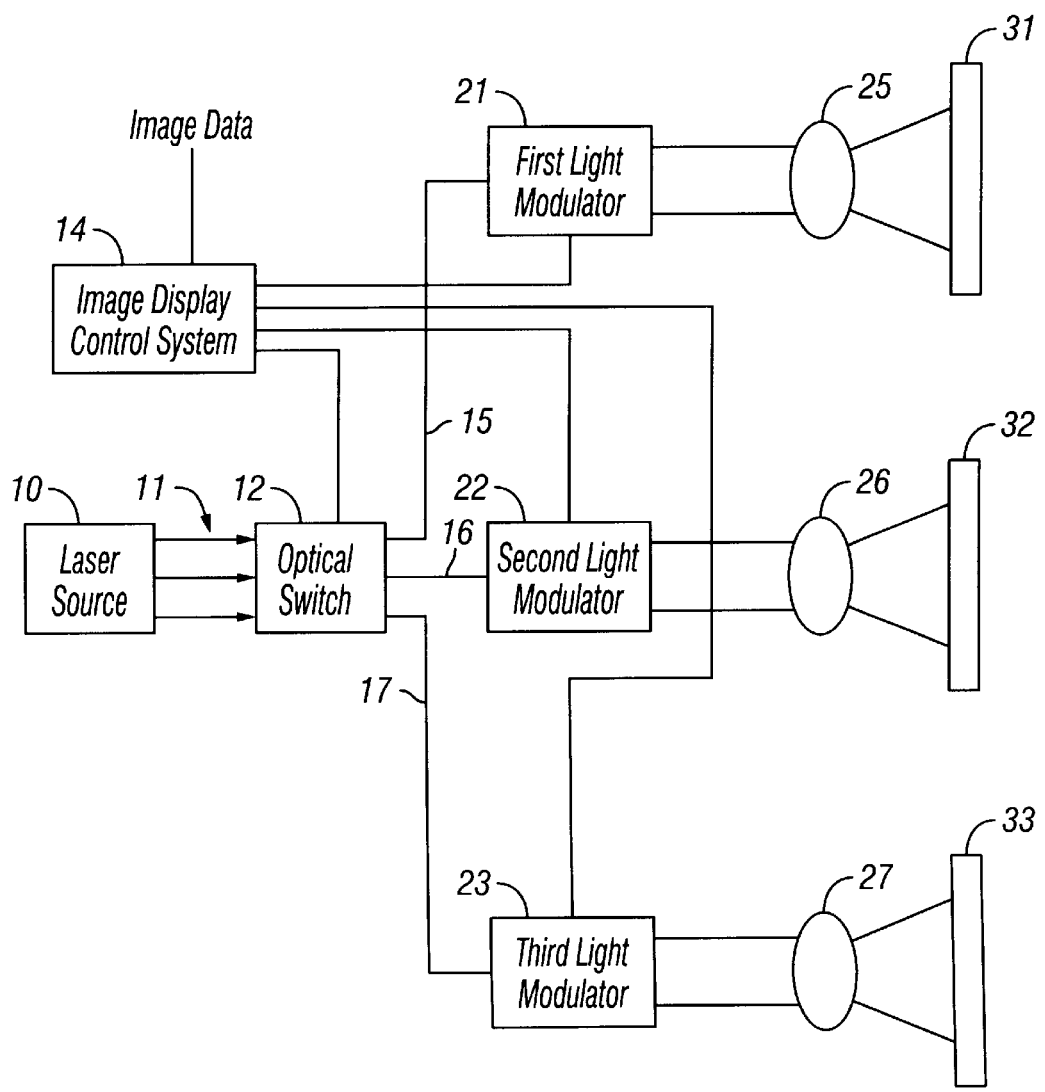
FIG. 1 is a schematic view of one embodiment of a multi-screen laser projection system that includes three laser beams, three light modulators, and three screens.

FIG. 1 is a schematic view of one embodiment of a multi-screen laser projection system. In this embodiment, a laser source 10 provides a plurality of beams 11 to an optical switch 12. Typically, the plurality of beams 11 comprises a red beam, green beam, and a blue beam, and therefore this description may describe the beams as red, green, and blue; however it should be apparent that other colors and/or combinations of colors could be utilized. The laser source 10 can be implemented in any number of ways, including separate red, green, and blue lasers. The lasers may be continuous wave (cw) or pulsed. In one embodiment, the laser source may comprise the laser system disclosed in U.S. Pat. No. 5,740,190 issued Apr. 14, 1998, entitled "Three-colored Coherent Light System", which is incorporated by reference herein. Generally, the system disclosed in U.S. Pat. No. 5,740,190 includes a main laser source that generates a laser beam that is subsequently optically processed to provide three separate beams: red, green, and blue.

The red, green, and blue beams from the laser source 10 are supplied to the optical switch 12, which is controlled by signals from an image display control system 14 responsive to image data, in order to switch each of the beams as required. In the embodiment shown in FIG. 1, the optical switch is a 3:3 switch in which any of the three laser beams can be switched to any of three separate optical paths (or "arms"), including a first arm 15, a second arm 16, and a third arm 17. The first arm 15 includes a first light modulator 21, the second arm 16 includes a second light modulator 22, and the third arm 17 includes a third light modulator 23. The image display control system 14 is connected to the first, second, and third light modulators 21, 22, and 23 to modulate the incident beam in order to display an image corresponding to the image data. By controlling the switch 12, the image control system 14 selects the incident beam (and thereby color) illuminating the respective modulator, and accordingly the image control system 14 modulates the modulator with the image data for that color and frame, as described elsewhere herein. Some embodiments may require a driver for the modulators, and such a driver may comprise a part of the image control system, or a part of the modulator block.

In one embodiment, the light modulators comprise two-dimensional modulator arrays that simultaneously modulate all the pixels on the entire screen. Such an embodiment could utilize digital micromirror devices (DMDs) available from Texas Instruments of Dallas, Tex. However other embodiments could utilize different types of light modulators.

The modulated light from each of the three modulators is respectively supplied via projection optical systems to a screen upon which the image is displayed. Particularly, a first projection optical system 25 projects modulated light from the first light modulator 21 onto a first screen 31, a second projection optical system 26 projects modulated light from the second light modulator 22 onto a second screen 32, and a third optical projection system projects modulated light from the third light modulator 23 onto a third screen 33. In this example, there are three modulator/screen arms, and three beams (red, green, and blue). However, in other embodiments, a different number of arms can be used, or different multiples of three could be utilized. For example, instead of three modulator/screen arms, each beam from the laser source 10 could be split to provide light for six arms.

In other embodiments a different number of beams and/or colors may be used; and accordingly the laser source would provide the desired number of beams. For example, in an embodiment that utilizes four colors, the laser source 10 would generate four laser beams, and accordingly, four modulator/screen arms would be utilized with those four colors. Generally, it is believed to be most efficient to provide a one-to-one relationship between the number of colors and the number of modulator arms.

For most laser sources, power fluctuations and beam quality problems occur around "power-on' and "power-off" times, and accordingly it is usually desirable to keep the laser source powered on at all times to maintain a steady state in the laser with predictable beam quality. A one-to-one relationship between the number of modulated laser beams and the number of screens can be efficient because all of the beams should be energized at all times in order to be available as needed for projection display. Of course, less efficient embodiments may not have the one-to-one relationship between the number of beams and the modulator arms: for example in an embodiment that has three beams and only two modulator arms, about ⅓ of the laser output power would be wasted as compared with an embodiment that has three modulator arms as disclosed herein. Furthermore, in one embodiment in which a single laser simultaneously produces pulsed red, green, and blue light, it can be efficient to simultaneously pulse the laser in all three colors.

Figure 2:
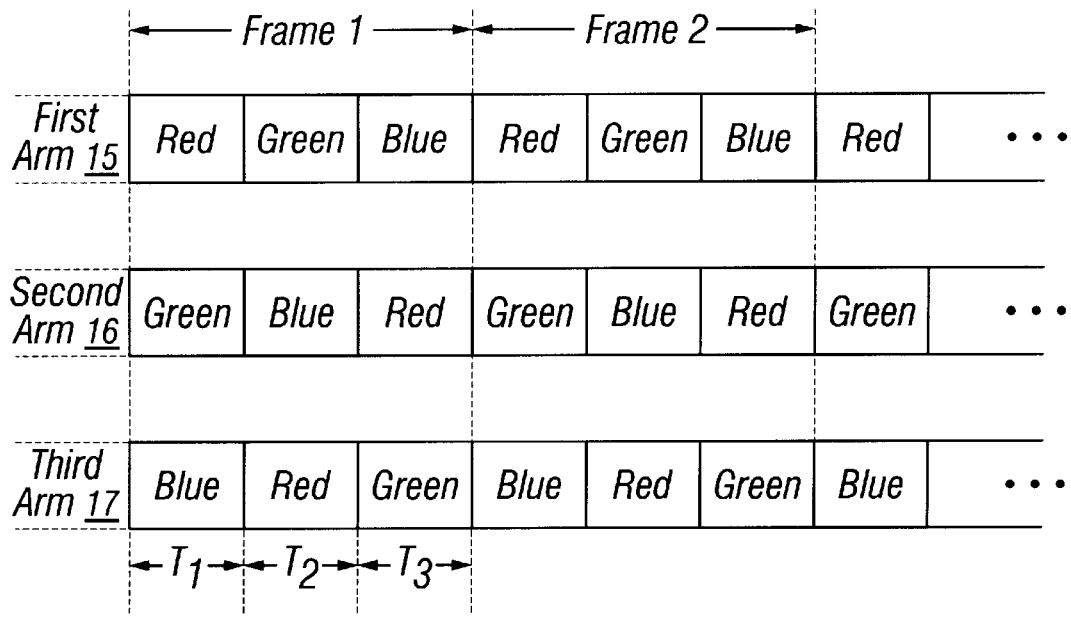
FIG. 2 is a timing diagram that shows an example of a sequence of colors that illuminates each light modulator.

FIG. 2 is a timing diagram that shows one example of a beam sequence that illuminates each modulator with each beam (and therefore each color) during a frame. Each sequence is shown for its respective arm (and modulator), and the sequence is typically repeated in each subsequent frame. In this example, in the first frame, the first arm 15 (and the first light modulator 21) receives a first beam sequence including a red beam, a green beam, and then a blue beam, which is repeated in frame two and all subsequent frames. The second arm 16 (and the second light modulator 22) receives a second beam sequence including a green beam, a blue beam, and then a red beam, which is repeated in frame two. The third arm 17 (and the third light modulator 23) receives a third beam sequence including a blue beam, a red beam, and then a green beam, which is repeated in frame two and all subsequent frames.

It can be seen that each of the beams illuminates each light modulator during each frame in order to provide full color images to each screen; i.e. during one period, each of the colors is sequenced to all of the light modulators. For example, in first period T1 the red beam illuminates the first light modulator 21, and in the second period the red beam illuminates the third light modulator 23, and in the third period the red beam illuminates the second light modulator 22. This pattern is repeated for all subsequent frames so that each frame has full color capability.

In this embodiment, each of the beams illuminates one of the three light modulators at all times except during switching intervals between periods, thereby improving efficiency. For example during each of the periods T1, T2, and T3, all of the beams are respectively incident upon a light modulator, which reduces the amount of wasted light energy.

Figure 3:
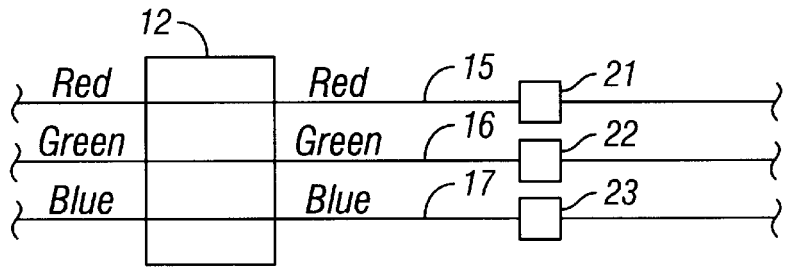
FIG. 3 shows a first configuration of the optical switch during a first period T1 in the example of FIG. 2.

FIG. 3 shows a configuration of the optical switch 12 during the first period T1. During this time T1, the optical switch 12 is arranged so that the red beam is directed to the first light modulator 21, the green beam is directed to the second light modulator 22, and the blue beam is directed to the third light modulator 23.

Figure 4:
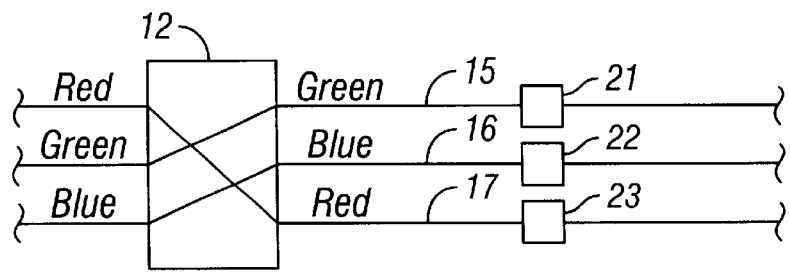
FIG. 4 shows a second configuration of the optical switch during a second period T2 in the example of FIG. 2.

FIG. 4 shows the configuration of the optical switch at time T2. In this time period the red beam is switched to the third light modulator 23, the green beam is switched to the first light modulator 21, and the blue beam 22 is switched to the second light modulator.

Figure 5:
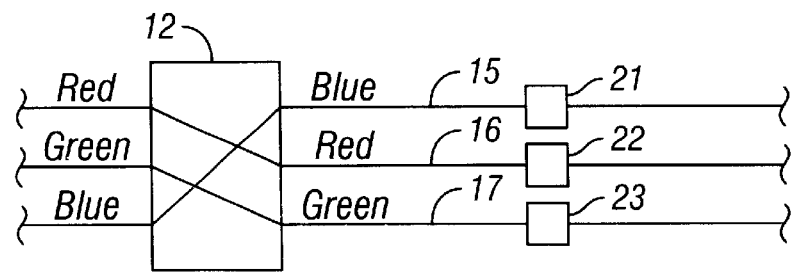
FIG. 5 shows a third configuration of the optical switch during a third period T3 in the example of FIG. 2.

FIG. 5 shows a configuration of the optical switch in the third period T3, in which the red beam is switched to the second light modulator 22, the green beam is switched to the third light modulator 23, and the blue beam is switched to the first light modulator 21.

In alternative embodiments, other beam sequences can be utilized; it should be clear that this description is just an example. For example, in other embodiments the first light modulator may receive the sequence of blue, green, and red in each frame rather than then the red, green, blue as shown. If the red, green, and blue are thought of as examples of a first color, second color, and third color, then it should be apparent that other color sequences can be utilized, as long as each beam is incident upon each light modulator at some point during the frame so that it can display its color.

In one embodiment, the laser source 10 provides pulsed laser beams. In other words, the laser source can be utilized to provide rapidly-pulsed red, green, and blue beams that appear to the human eye to be a single continuous beam. In such a system, the laser system provides a uniform stream of short pulses instead the continuous-wave (cw) illumination that is more conventionally used. The stream of pulses is generated to be highly uniform in its energy content, and each pulse has a predictable width that is within certain specifications. In such a system, because the pulses are substantially equal in energy, the collective energy delivered to any pixel during the period of one frame becomes truly digital, because each micromirror is used like a gate and passes a discrete number of pulses. Because the pulses are synchronized with the micromirror, the number of pulses that are projected can be accurately controlled. This system is described in more detail in U.S. patent application Ser. No. 10/040,057 entitled: "Digital Display System Using Pulsed Lasers," by same inventor as herein, filed of even date herewith, which is incorporated by reference herein. In one such embodiment, the single laser simultaneously produces pulsed red, green, and blue light, in which all the light is pulsed simultaneously in phase, which can be useful because the intervals between pulses are predictable and consistent for all of the colors.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A multi-screen laser projection system for projecting images onto a plurality of screens, said projection system comprising:

a laser source that generates a plurality of laser beams, at least two of said laser beams having differing colors;

an image display control system that receives image data indicative of the images to be projected;

a plurality of modulator arms, each modulator arm including a light modulator coupled to said image control system; and an optical switch situated between said laser source and said plurality of modulator arms, said optical switch coupled to said image display control system and arranged to receive said plurality of beams from said laser source and switch each of said beams to a selected one of said modulator arms.

2. The system of claim 1 further comprising a plurality of projection optical systems, and wherein each of said modulator arms further comprises one of said projection optical systems, each arranged to project modulated light from its respective light modulators onto one of the plurality of screens.

3. The projection system of claim 1 wherein said plurality of beams includes a red laser beam, a green laser beam, and a blue laser beam, thereby providing a full-color image.

4. The projection system of claim 1 wherein the number of modulator arms is equal to the number of beams supplied from said laser source to said optical switch.

5. The projection system of claim 1 wherein said image display control system is arranged to control said optical switch to sequentially illuminate at least one of said light modulators with each of said plurality of beams.

6. The projection system of claim 5 wherein said image display control system is arranged to control said optical switch to sequentially illuminate each of said light modulators with each of said plurality of beams.

7. The projection system of claim 1 wherein said laser source generates pulsed laser beams so that said plurality of laser beams are pulsed.

8. A multi-screen full color laser projection system for projecting images onto a plurality of screens, said projection system comprising:

a laser source that generates a plurality of laser beams including a red beam, a green beam, and a blue beam;

an image display control system that receives image data indicative of the images to be projected;

a plurality of modulator arms, each modulator arm including a light modulator coupled to said image control system; and an optical switch situated between said laser source and said plurality of modulator arms, said optical switch coupled to said image display control system and arranged to receive said plurality of beams from said laser source and switch each of said beams to a selected one of said modulator arms.

9. The system of claim 8 further comprising a plurality of projection optical systems, and wherein each of said modulator arms further comprises one of said projection optical systems, each arranged to project modulated light its respective light modulators onto one of the plurality of screens.

10. The projection system of claim 8 wherein the number of modulator arms is equal to the number of beams supplied from said laser source to said optical switch.

11. The projection system of claim 8 wherein said image display control system is arranged to control said optical switch to sequentially illuminate at least one of said light modulators with each of said plurality of beams so that said red beam illuminates a first one of said light modulators during a first period, said green beam illuminates said first light modulator during a second period, and said blue beam illuminates said first light modulator during a third period.

12. The projection system of claim 11 wherein said image display control system is arranged to control said optical switch to sequentially illuminate each of said light modulators with each of said plurality of beams.

13. A multi-screen laser projection system for projecting images onto a plurality of screens, said projection system comprising:

laser means for generating a plurality of laser beams;

a plurality of light modulators;

means for switching the plurality of beams between said light modulators so that each of said light modulators is sequentially illuminated with said plurality of laser beams, and so that only a single beam is incident upon any one of said light modulators at any one time; and means for modulating each of said light modulators with image data.

14. The system of claim 13 further comprising a plurality of projection optical systems, wherein each of said modulators further comprises one of said projection optical systems, each arranged to project modulated light its respective light modulators onto one of the plurality of screens.

15. The system of claim 13 wherein said laser means includes means for generating a red laser beam, a green laser beam, and a blue laser beam.

16. The projection system of claim 13 wherein the number of light modulators is equal to the number of beams supplied by said laser means.

17. The projection system of claim 13 further comprising means for sequentially illuminating at least one of said light modulators with each of said plurality of beams.

18. The projection system of claim 17 further comprising means for sequentially illuminate each of said light modulators with each of said plurality of beams.

19. The system of claim 13 wherein said laser means includes means for generating pulsed laser beams.

20. A method for projecting images onto a plurality of screens, comprising:

generating a plurality of laser beams;

switching the plurality of beams between a plurality of light modulators so that each of said light modulators is sequentially illuminated with said plurality of laser beams, and so that only a single beam is incident upon any one of said light modulators at any one time;

modulating said light modulators with image data; and respectively projecting modulated light from said plurality of light modulators onto said plurality of screens.

21. The method of claim 20 wherein said step of generating a plurality of laser beams includes generating a red laser beam, a green laser beam, and a blue laser beam.

22. The method of claim 20 wherein said switching step includes switching a number of laser beams equal to the number of light modulators.

23. The method of claim 20 further comprising sequentially illuminating at least one of said light modulators with each of said plurality of beams.

24. The method of claim 23 further comprising sequentially illuminating each of said light modulators with each of said plurality of beams.

25. The method of claim 20 wherein said step of generating a plurality of laser beams includes generating pulsed laser beams.

* * * * *